US011894635B2

(12) United States Patent
Lin et al.

(10) Patent No.: US 11,894,635 B2
(45) Date of Patent: Feb. 6, 2024

(54) ELECTRICAL CONNECTOR

(71) Applicant: Cheng Uei Precision Industry Co., LTD., New Taipei (TW)

(72) Inventors: Chun-Fu Lin, New Taipei (TW); Sheng-Nan Yu, New Taipei (TW); Chih-Hsien Chiang, New Taipei (TW)

(73) Assignee: CHENG UEI PRECISION INDUSTRY CO., LTD., New Taipei (TW)

(*) Notice: Subject to any disclaimer, the term of this patent is extended or adjusted under 35 U.S.C. 154(b) by 82 days.

(21) Appl. No.: 17/855,759

(22) Filed: Jun. 30, 2022

(65) Prior Publication Data

US 2023/0029582 A1 Feb. 2, 2023

(30) Foreign Application Priority Data

Jul. 29, 2021 (CN) ........................ 202121751453.X

(51) Int. Cl.
*H01R 13/62* (2006.01)
*H01R 13/629* (2006.01)
*H01R 13/621* (2006.01)
*H01R 13/639* (2006.01)

(52) U.S. Cl.
CPC ... *H01R 13/62927* (2013.01); *H01R 13/6215* (2013.01); *H01R 13/62916* (2013.01); *H01R 13/639* (2013.01)

(58) Field of Classification Search
None
See application file for complete search history.

(56) References Cited

U.S. PATENT DOCUMENTS

| | | | | |
|---|---|---|---|---|
| 5,584,718 A * | 12/1996 | Sukegawa | H01R 13/6272 | 439/352 |
| 6,902,432 B2 * | 6/2005 | Morikawa | H01R 13/6275 | 439/607.41 |
| 6,991,479 B2 * | 1/2006 | Miao | H01R 13/6397 | 439/352 |
| 7,125,267 B1 * | 10/2006 | Yeh | H01R 24/62 | 439/131 |
| 7,160,137 B1 * | 1/2007 | Yeh | H01R 13/6397 | 439/358 |
| 7,192,295 B1 * | 3/2007 | Yeh | H01R 13/6275 | 439/923 |
| 7,594,827 B2 * | 9/2009 | Takamoto | H01R 13/6397 | 439/353 |

(Continued)

*Primary Examiner* — Ross N Gushi
(74) *Attorney, Agent, or Firm* — Cheng-Ju Chiang

(57) ABSTRACT

An electrical connector includes an insulating body, a plurality of terminals fastened in the insulating body, an elastic element mounted to a surface of the insulating body, a camshaft and a shell. The elastic element has a body portion, at least one elastic arm slantwise extended frontward and outward, and then extended frontward from one end of the body portion, at least one extension arm slantwise extended outward and rearward from at least one side of the body portion, and a tail portion slantwise extended upward and rearward from the other end of the body portion. The camshaft is arranged at a rear end of the insulating body. The camshaft has a rotating shaft and a cam portion. The cam portion is arranged corresponding to the tail portion. The shell surrounds the insulating body, the plurality of the terminals, the elastic element and the camshaft.

15 Claims, 7 Drawing Sheets

(56) References Cited

U.S. PATENT DOCUMENTS

| | | | | |
|---|---|---|---|---|
| 7,635,272 | B2 * | 12/2009 | Poppe | H01R 13/6397 70/58 |
| 7,854,618 | B2 * | 12/2010 | Liu | H01R 13/6275 439/131 |
| 7,909,632 | B2 * | 3/2011 | Wu | H01R 9/03 439/353 |
| 7,913,527 | B2 * | 3/2011 | Chen | G06F 21/85 70/57 |
| 8,033,853 | B2 * | 10/2011 | Chang | H01R 13/6397 439/304 |
| 8,845,356 | B2 * | 9/2014 | Cheatham | H01R 13/6275 439/304 |
| 9,362,673 | B1 * | 6/2016 | Rinker | H01R 13/6275 |
| 9,391,403 | B2 * | 7/2016 | Ahn | H01R 13/633 |
| 9,397,442 | B2 * | 7/2016 | Sutter | H01R 13/6582 |
| 9,590,355 | B2 * | 3/2017 | Kawamura | H01R 13/633 |
| 9,698,531 | B2 * | 7/2017 | Su | H01R 13/6397 |
| 10,236,628 | B2 * | 3/2019 | Motohashi | H01R 13/6275 |
| 10,276,978 | B2 * | 4/2019 | Whitehead | H01R 13/6275 |
| 10,522,946 | B1 * | 12/2019 | Upadhyaya | H01R 13/6397 |
| 10,944,213 | B2 * | 3/2021 | Su | H01R 13/6397 |
| 11,581,681 | B2 * | 2/2023 | Nguyen | H01R 13/639 |
| 2010/0285683 | A1 * | 11/2010 | Zhang | H01R 13/6275 439/357 |
| 2022/0399681 | A1 * | 12/2022 | Hsu | H01R 13/516 |

* cited by examiner

ELECTRICAL CONNECTOR

CROSS-REFERENCE TO RELATED APPLICATION

The present application is based on, and claims priority from, China Patent Application No. 202121751453.X, filed Jul. 29, 2021, the disclosure of which is hereby incorporated by reference herein in its entirety.

BACKGROUND OF THE INVENTION

1. Field of the Invention

The present invention generally relates to an electrical connector, and more particularly to an electrical connector with a bolt-lock function.

2. The Related Art

A Universal Serial Bus (USB) connector is the most widely used connector among connectors which are frequently used in various electronic products. With the development of sciences and technologies, more and more kinds of the USB connectors are developed, such as USB 2.0, USB 3.0, Micro USB, Mini USB or USB Type-C. The above-mentioned kinds of the USB connectors are appropriate for different usage situations. The USB connector is an electrical connector.

Conventionally, the electrical connector includes an insulating housing, a plurality of terminals fastened to the insulating housing, and a metal shell fixed to the insulating housing. The insulating housing has a tongue board, and a docking portion extended frontward from a front end of the tongue board. The plurality of the terminals include a conductive terminal, two pairs of high-speed differential signal terminals and a grounding terminal. The grounding terminal is located between the two pairs of the high-speed differential signal terminals. The conductive terminal has a flat first contacting portion, a first soldering portion, and a first fastening portion connected between the first contacting portion and the first soldering portion. Each of the two pairs of the high-speed differential signal terminals and the grounding terminal has a flexible second contacting portion, a second soldering portion, and a second fastening portion connected between the second contacting portion and the second soldering portion. The second soldering portion of the grounding terminal is connected with a soldering pad. A width of the soldering pad of the grounding terminal is larger than a width of the second soldering portion of each high-speed differential signal terminal, so a soldering and assembling efficiency of the electrical connector is greatly improved in a mass production, and a cost of the electrical connector is lowered.

However, the electrical connector is without a bolt-lock function, after the electrical connector is connected with a docking connector, the electrical connector is apt to be disconnected from the docking connector on account of the electrical connector being pulled by an external force or collided accidentally. As a result, a connecting reliability of the electrical connector is declined.

Therefore, it is necessary to provide an electrical connector with a bolt-lock function to improve a connecting reliability of the electrical connector.

SUMMARY OF THE INVENTION

An object of the present invention is to provide an electrical connector with a bolt-lock function. The electrical connector includes an insulating body, a plurality of terminals fastened in the insulating body, an elastic element mounted to a surface of the insulating body, a camshaft and a shell. The elastic element has a body portion, at least one elastic arm slantwise extended frontward and outward, and then extended frontward from one end of the body portion, at least one extension arm slantwise extended outward and rearward from at least one side of the body portion, and a tail portion slantwise extended upward and rearward from the other end of the body portion. A free end of the at least one elastic arm is bent downward to form a snap hook. The camshaft is arranged at a rear end of the insulating body. The camshaft has a rotating shaft and a cam portion. The cam portion is arranged corresponding to the tail portion of the elastic element. The shell surrounds the insulating body, the plurality of the terminals, the elastic element and the camshaft. The shell has a through hole vertically penetrating through the shell. The through hole is corresponding to the snap hook. When the rotating shaft rotates, the cam portion pushes the tail portion to twist the at least one extension arm, so the at least one elastic arm moves outward, and the snap hook passes through the through hole.

Another object of the present invention is to provide an electrical connector. The electrical connector includes an insulating body, a plurality of terminals, an elastic element, a camshaft and a shell. The insulating body has a base portion, and an extension portion extended rearward from a rear end of the base portion. The extension portion extends upward or downward to form at least one positioning portion. The at least one positioning portion has a front clamping section and a rear clamping section. The front clamping section and the rear clamping section are longitudinally separated from each other to form a clamping groove between the front clamping section and the rear clamping section. The plurality of the terminals are fastened in the base portion of the insulating body. The elastic element is mounted to a bottom surface of the insulating body. The elastic element has a body portion, at least one elastic arm slantwise extended frontward from one end of the body portion, at least one extension arm extended laterally from at least one side of the body portion, and a tail portion slantwise extended upward and rearward from the other end of the body portion. The at least one elastic arm is slightly inclined upward. A front end of the at least one elastic arm is bent downward to form a snap hook. The camshaft has a rotating shaft and a cam portion. The cam portion is arranged corresponding to the tail portion of the elastic element. The rotating shaft is accommodated in the clamping groove of the at least one positioning portion. The shell surrounds the insulating body, the plurality of the terminals and the elastic element. A bottom of the shell has a through hole vertically penetrating through the bottom of the shell. The through hole is corresponding to the snap hook. When the rotating shaft rotates in a forward direction, the rotating shaft drives the cam portion to rotate, the cam portion pushes the tail portion to twist the at least one extension arm, the at least one extension arm drives the at least one elastic arm to twist downward, the snap hook passes through the through hole. When the rotating shaft rotates in a reverse direction, the cam portion gradually breaks away from the tail portion to make the at least one extension arm elastically return to an original position, the at least one extension arm drives the at least one elastic arm to move to an initial position, the snap hook is receded from the through hole.

Another object of the present invention is to provide an electrical connector cooperated with a docking connector. The docking connector includes an outer shell. Two sides of a bottom wall of the outer shell define two openings. The electrical connector includes an insulating body, a plurality of terminals fastened in the insulating body, an elastic element mounted to a surface of the insulating body, a camshaft and a shell. The elastic element has a body portion, two elastic arms slantwise extended frontward and outward, and then extended frontward from two sides of one end of the body portion, two extension arms slantwise extended outward and rearward from two front ends of two sides of the body portion, and a tail portion slantwise extended upward and rearward from the other end of the body portion. The two elastic arms are slightly inclined upward. A front end of each elastic arm is bent downward to form a snap hook. The camshaft is arranged at a rear end of the insulating body. The camshaft has a rotating shaft and a cam portion. A front of the cam portion is outwardly arched along a radial direction of the rotating shaft to form a cam surface. The cam portion is arranged corresponding to the tail portion of the elastic element. The shell surrounds the insulating body, the plurality of the terminals, the elastic element and the camshaft. A bottom of the shell has two through holes vertically penetrating through the bottom of the shell. The two through holes are corresponding to the two snap hooks. When the rotating shaft rotates in a forward direction, the rotating shaft drives the cam portion to rotate, the cam surface of the cam portion slides frontward and upward to a tip of the tail portion along a rear surface of the tail portion, the cam surface of the cam portion pushes the tail portion to twist the two extension arms, the two extension arms drive the two elastic arms to twist downward to abut against an inner surface of the shell, the two snap hooks are buckled to the two through holes, the two snap hooks project out of the shell through the two through holes, and the two snap hooks are buckled to the two openings of the docking connector, the electrical connector is locked to the docking connector. When the rotating shaft rotates in a reverse direction, the rotating shaft drives the cam surface of the cam portion to rotate to slide downward from the tip of the tail portion, the cam surface of the cam portion gradually breaks away from the tip of the tail portion to make the two extension arms elastically return to two original positions, the two extension arms drive the two elastic arms to move to two initial positions, the two snap hooks are receded from the two openings and the two through holes, so the electrical connector is unlocked with the docking connector.

As described above, the electrical connector includes the plurality of the positioning portions, the elastic element, the camshaft and a stopping portion, and the electrical connector is able to be locked with the docking connector by rotating the rotating shaft, the rotating shaft drives the cam portion to rotate, the cam surface of the cam portion gradually moves towards the tip of the tail portion of the elastic element along the outer surface of the tail portion, the two extension arms twist by pushing the tail portion, the two extension arms drive the two elastic arms to move downward, the two elastic arms abut against the inner surface the bottom plate of the shell, the two snap hooks are buckled to the two through holes of the shell and the outer shell of the docking connector, so the electrical connector is docked with the docking connector. Therefore, the electrical connector is with a bolt-lock function, and a connecting reliability of the electrical connector is greatly improved.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
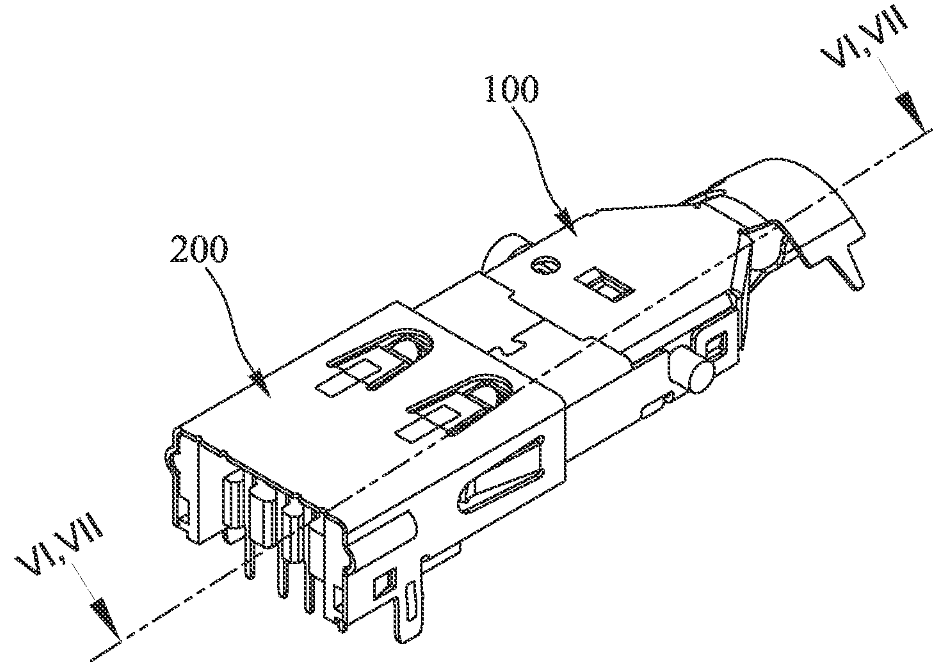
FIG. 1 is a perspective view of an electrical connector in accordance with a preferred embodiment of the present invention, wherein the electrical connector is connected to a docking connector.
Figure 2:
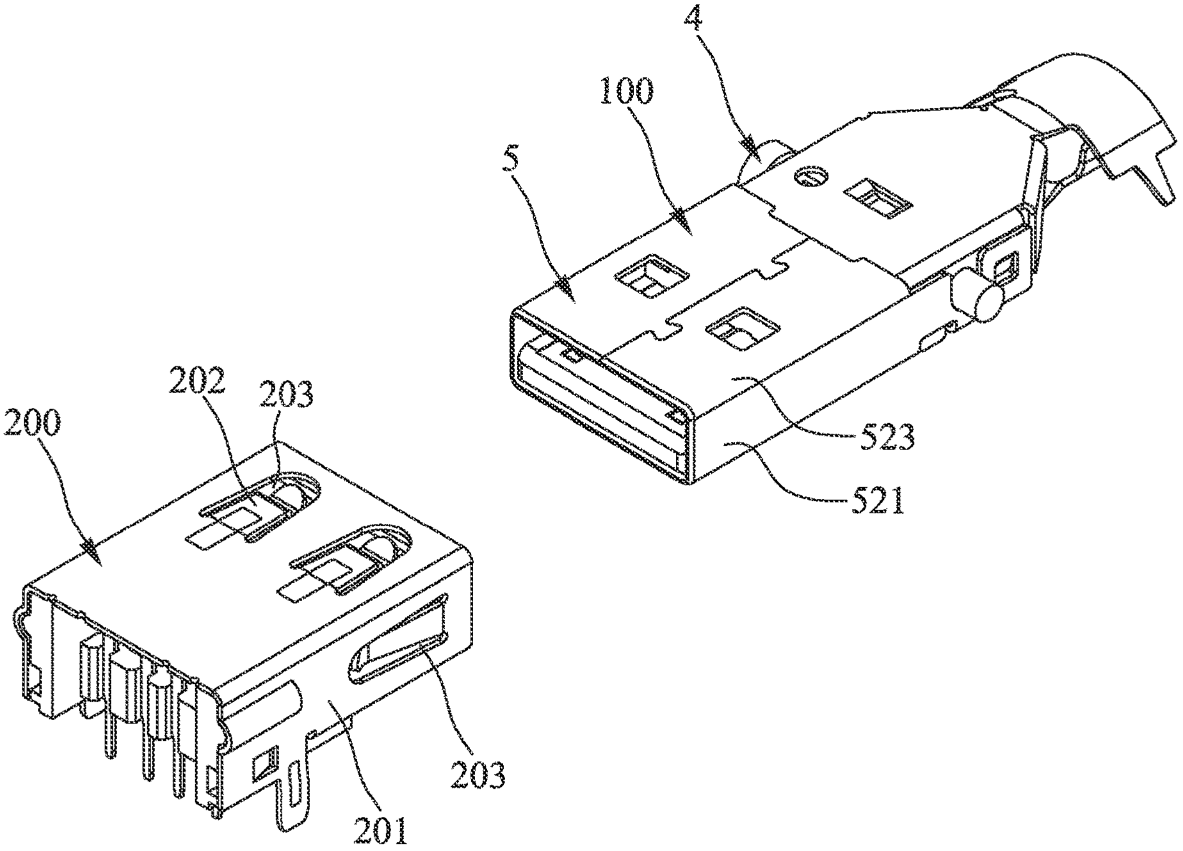
FIG. 2 is a perspective view of the electrical connector in accordance with the preferred embodiment of the present invention, wherein the electrical connector is separated from the docking connector.

Referring to FIG. 1 and FIG. 2, an electrical connector 100 in accordance with a preferred embodiment of the present invention is shown. The electrical connector 100 is cooperated with a docking connector 200. The electrical connector 100 is connected with the docking connector 200. In the preferred embodiment, the electrical connector 100 is a male USB (Universal Serial Bus) connector, and the electrical connector 100 is a USB cable connector. The docking connector 200 is a female USB connector, and the docking connector 200 is a USB board end connector. The docking connector 200 is able to be marked in an appropriate way. A type of the electrical connector 100 in accordance with the present invention is without being limited. The electrical connector 100 is also able to be a HDMI (High-Definition Multimedia Interface) connector, a D-Sub connector or a X-SFP (Small Form-Factor Pluggable) connector, etc.

Figure 3:
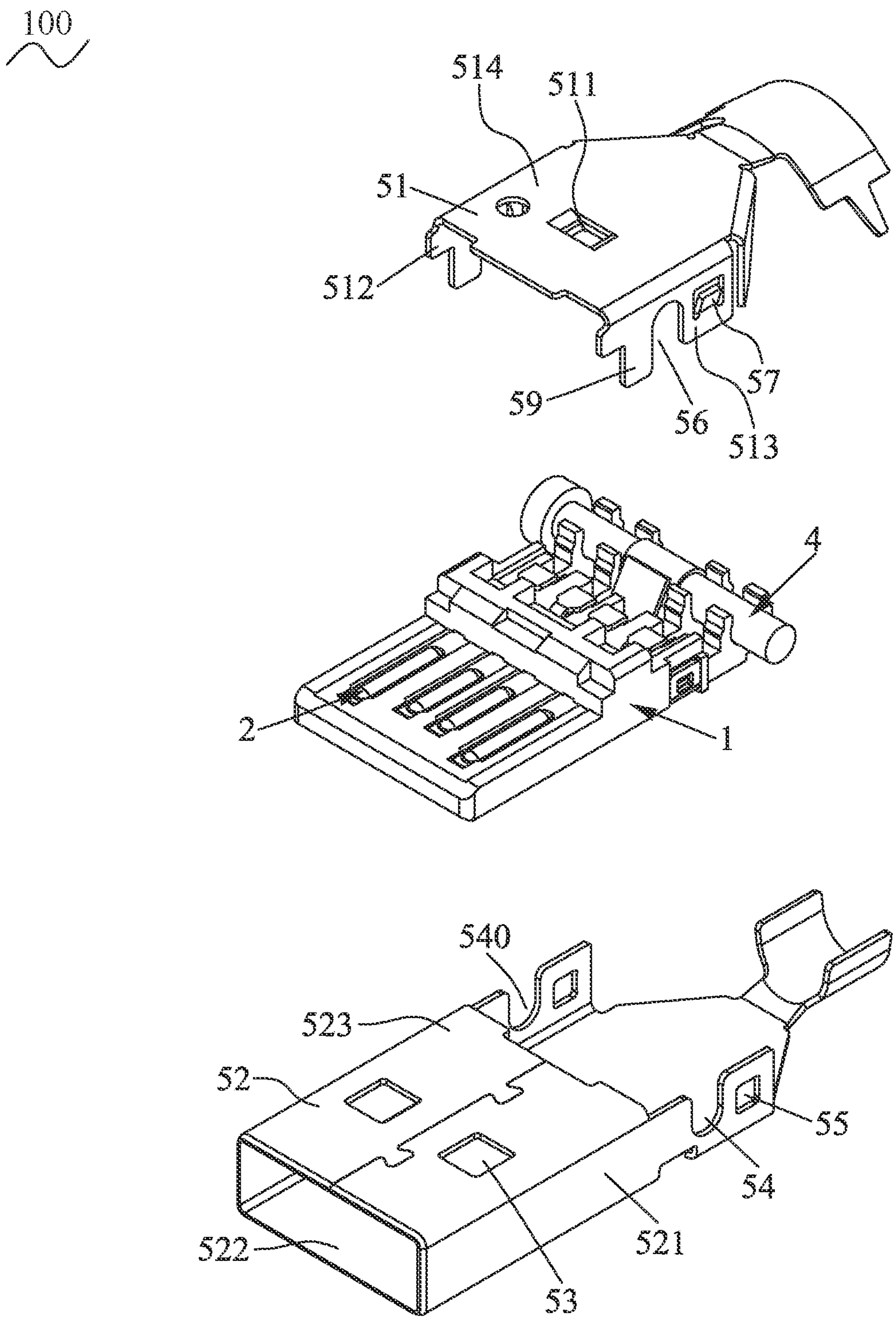
FIG. 3 is an exploded view of the electrical connector according to the preferred embodiment of the present invention.
Figure 4:
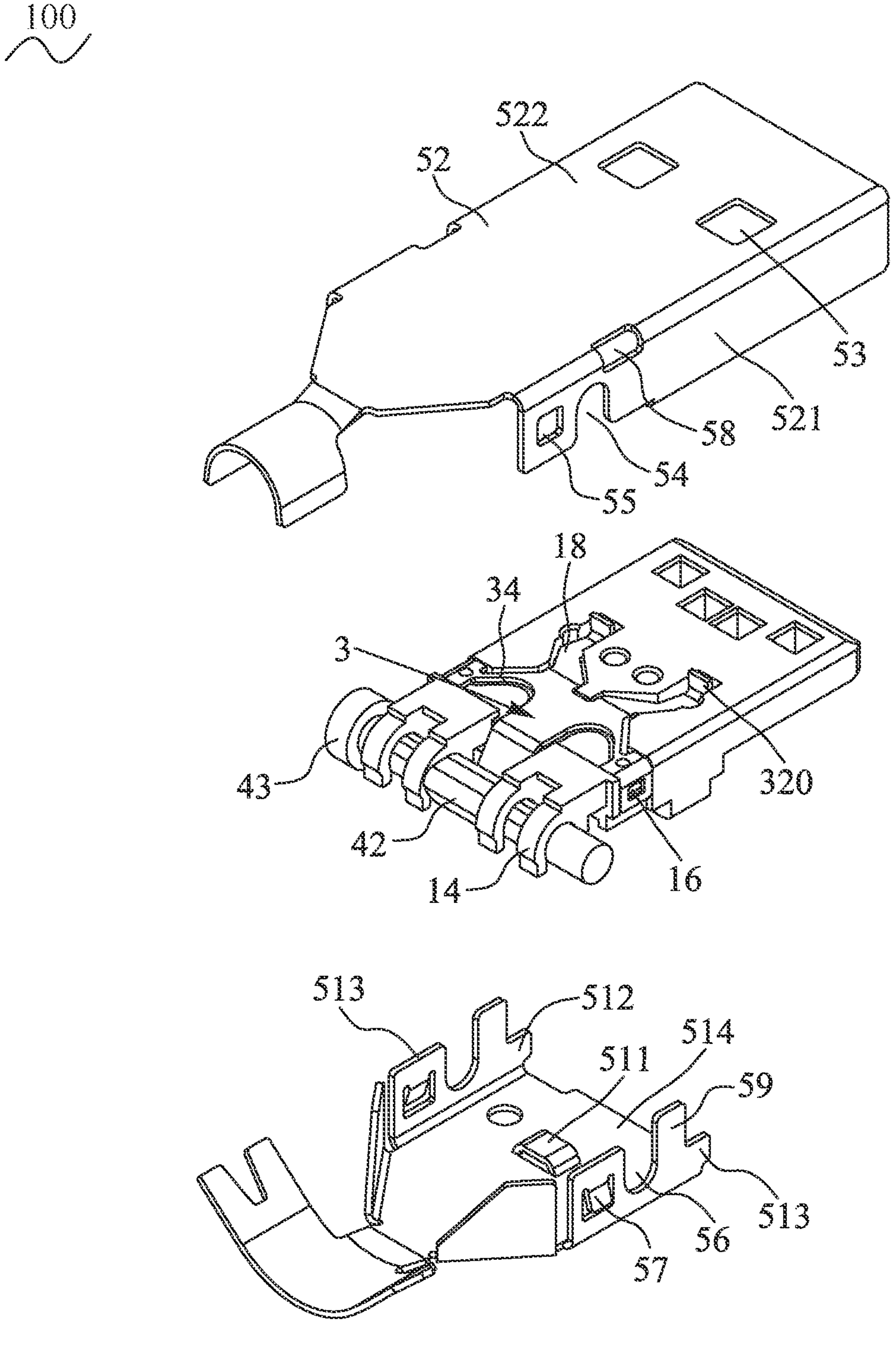
FIG. 4 is another exploded view of the electrical connector according to the preferred embodiment of the present invention.
Figure 5:
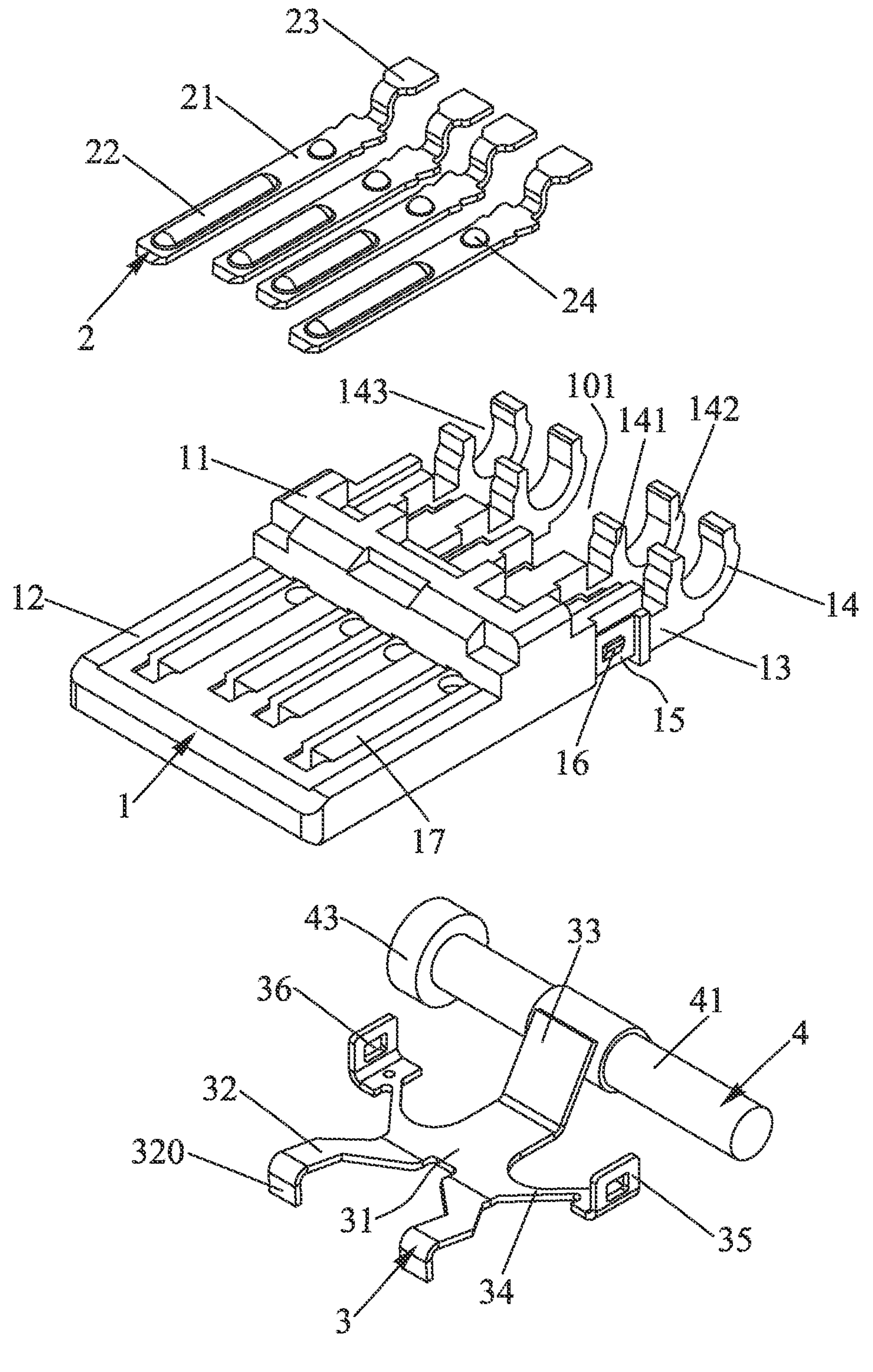
FIG. 5 is a partially exploded view of the electrical connector according to the preferred embodiment of the present invention.
Figure 6:
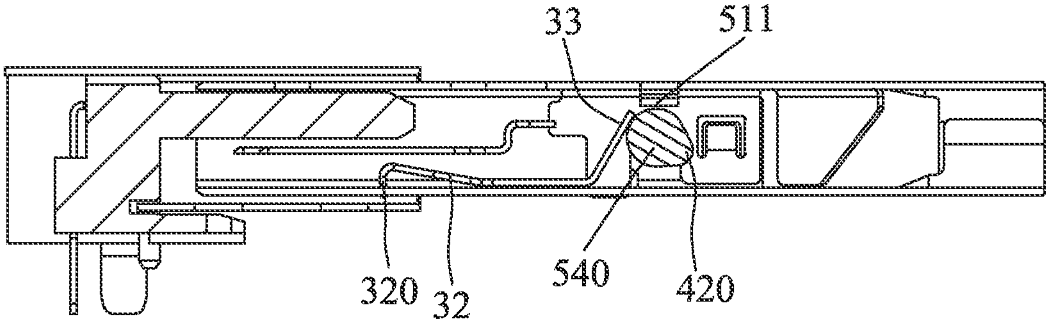
FIG. 6 is a sectional view of the electrical connector according to the preferred embodiment of the present invention, wherein the electrical connector is unlocked with the docking connector.
Figure 7:
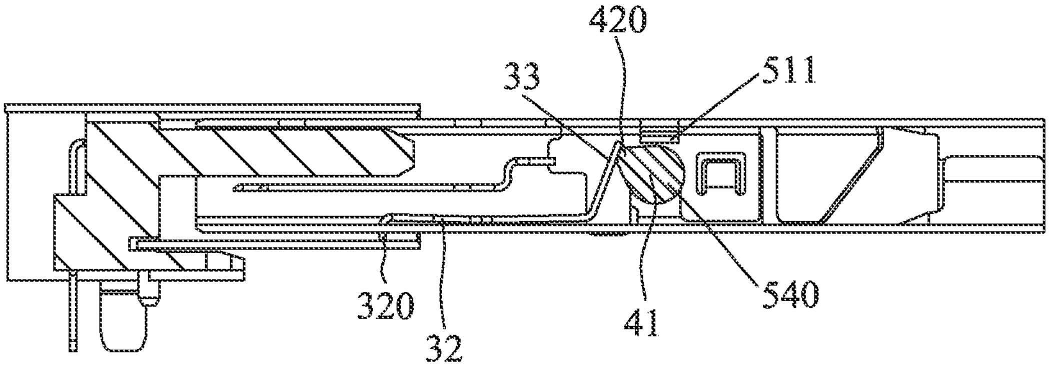
FIG. 7 is another sectional view of the electrical connector according to the preferred embodiment of the present invention, wherein the electrical connector is locked with the docking connector.

Referring to FIG. 3 to FIG. 5, the electrical connector 100 includes an insulating body 1, a plurality of terminals 2, an elastic element 3, a camshaft 4 and a shell 5. The plurality of the terminals 2 are fastened in the insulating body 1. The elastic element 3 is mounted to a surface of the insulating body 1. The elastic element 3 is mounted to a bottom surface of the insulating body 1. The camshaft 4 is arranged at a rear end of the insulating body 1, and the camshaft 4 contacts with a rear end of the elastic element 3. The shell 5 surrounds the insulating body 1, the plurality of the terminals 2, the elastic element 3 and the camshaft 4.

Referring to FIG. 2, the docking connector 200 includes an outer shell 201. A top wall, a bottom wall and two side walls of the outer shell 201 define a plurality of openings 203. Specifically, two sides of the top wall of the outer shell 201 define two openings 203. Two sides of the bottom wall of the outer shell 201 define two openings 203. Each side wall of the outer shell 201 defines one opening 203. A front inner wall of each opening 203 of the top wall and the bottom wall of the outer shell 201 extends rearward and towards a front end of the electrical connector 100, and then is arched inward to form a spring arm 202. A rear inner wall of each opening 203 of the two side walls extends frontward and then is arched inward to form another spring arm 202. Each spring arm 202 of the docking connector 200 is buckled with a corresponding structure of the shell 5 of the electrical connector 100 for electrically contacting with the electrical connector 100 and increasing a friction force between the electrical connector 100 and the docking connector 200.

Referring to FIG. 3 to FIG. 5, the insulating body 1 has the base portion 11, a tongue portion 12, an extension portion 13 extended rearward from a rear end of the base portion 11, at least one positioning portion 14 and two positioning notches 15. The extension portion 13 extends upward or downward to form the at least one positioning portion 14. The at least one positioning portion 14 has a front clamping section 141 and a rear clamping section 142. In the preferred embodiment, the insulating body 1 has two extension portions 13 and a plurality of the positioning portions 14. The plurality of the terminals 2 are arranged to the base portion 11, and the plurality of the terminals 2 are partially exposed to an upper surface of the base portion 11. The plurality of the terminals 2 are fastened in the base portion 11 of the insulating body 1. A lower portion of a front end of the base portion 11 extends frontward to form the tongue portion 12. The tongue portion 12 is inserted into the docking connector 200 for connecting with the docking connector 200. Front ends of the plurality of the terminals 2 are arranged in the tongue portion 12. Two sides of a lower portion of a rear end of the base portion 11 extend rearward to form the two extension portions 13. The two extension portions 13 are spaced from each other to form an interval 101 between the two extension portions 13. Tops of rear ends of the two extension portions 13 extend upward to form the plurality of the positioning portions 14, and the camshaft 4 is arranged on the plurality of the positioning portions 14.

Two sides of the rear end of the base portion 11 are recessed inward to form the two positioning notches 15. Two corresponding portions of the elastic element 3 are buckled in the two positioning notches 15, so that the elastic element 3 is located to the insulating body 1, and the elastic element 3 is fastened to the insulating body 1. Two inner side walls of the two positioning notches 15 oppositely protrude outward to form two buckling blocks 16. The two buckling blocks 16 are buckled to the two corresponding portions of the elastic element 3, so that the elastic element 3 is located to the insulating body 1, and the elastic element 3 is fastened to the insulating body 1.

Two sides of the top of the rear end of each extension portion 13 protrude upward to form two positioning portions 14. Each positioning portion 14 is a U shape seen from a side view. A mouth of each U-shaped positioning portion 14 faces upward. Two free ends of each U-shaped positioning portion 14 slightly protrude towards each other, so a top end of the mouth of each U-shaped positioning portion 14 is narrower than a bottom end of the mouth of each U-shaped positioning portion 14. Each positioning portion 14 is positioned between two adjacent terminals 2. Each positioning portion 14 has the front clamping section 141 and the rear clamping section 142. The front clamping section 141 and the rear clamping section 142 are longitudinally separated from each other to form a clamping groove 143 between the front clamping section 141 and the rear clamping section 142.

The insulating body 1 has a plurality of terminal grooves 17 for receiving the plurality of the terminals 2. Each terminal groove 17 extends longitudinally. Each terminal groove 17 vertically penetrates through an upper surface of the tongue portion 12, longitudinally penetrates through the base portion 11 and vertically penetrates through an upper surface of the rear end of the base portion 11. Each terminal 2 is disposed in one corresponding terminal groove 17.

Each terminal 2 has a fixing portion 21, a contacting portion 22 and a soldering portion 23. A front end of the fixing portion 21 extends frontward to form the contacting portion 22. A rear end of the fixing portion 21 extends rearward, then is bent upward, and further extends rearward to form the soldering portion 23. The fixing portion 21 of each terminal 2 is surrounded by the base portion 11 of the insulating body 1, and the fixing portion 21 of each terminal 2 is fixed in the base portion 11 of the insulating body 1. The fixing portion 21 of each terminal 2 is fixed in one terminal groove 17. The contacting portion 22 of each terminal 2 is fixed in the tongue portion 12 of the insulating body 1, and the contacting portion 22 of each terminal 2 is exposed to the upper surface of the tongue portion 12. The soldering portion 23 of each terminal 2 is exposed to the upper surface of the rear end of the base portion 11 of the insulating body 1. The soldering portion 23 of each terminal 2 is located in front of the camshaft 4.

A top surface of the fixing portion 21 of each terminal 2 protrudes upward to form a hollow hemisphere protruding portion 24. The protruding portion 24 of the fixing portion 21 of each terminal 2 abuts against an inner surface of a wall of the one terminal groove 17 of the insulating body 1. The protruding portion 24 of each terminal 2 is interfered with the inner surface of the wall of the one terminal groove 17 of the insulating body 1. The protruding portion 24 of each terminal 2 abuts against an inner surface of a top wall of the one terminal groove 17, and the protruding portion 24 of each terminal 2 is interfered with the inner surface of the top wall of the one terminal groove 17, so that a bottom surface of the fixing portion 21 of each terminal 2 fully abuts against an inner surface of a bottom wall of the one terminal groove 17 of the insulating body 1. A bottom surface of the base portion 11 of the insulating body 1 and a rear end of a bottom surface of the tongue portion 12 are recessed inward to together form a fastening groove 18. The elastic element 3 is accommodated in the fastening groove 18, and the elastic element 3 is able to move or twist in the fastening groove 18.

Referring to FIG. 2 to FIG. 7, the elastic element 3 has a body portion 31, at least one elastic arm 32 slantwise extended frontward and outward, and then extended frontward from one end of the body portion 31, a tail portion 33 slantwise extended upward and rearward from the other end of the body portion 31, at least one extension arm 34 and at least one flank 35. The at least one elastic arm 32 is slantwise extended frontward and outward, and then is extended frontward from a front end of the body portion 31. The at least one elastic arm 32 is slightly inclined upward. A free end of the at least one elastic arm 32 is bent downward to form a snap hook 320. A front end of the at least one elastic arm 32 is bent downward to form the snap hook 320.

A convex surface of the snap hook 320 faces frontward and upward. The snap hook 320 is an arc shape seen from a side view. The tail portion 33 is slantwise extended upward and rearward from a rear end of the body portion 31. The tail portion 33 abuts against a corresponding mechanism of the camshaft 4. The at least one extension arm 34 is extended laterally from at least one side of the body portion 31. The at least one extension arm 34 is slantwise extended outward and rearward from the at least one side of the body portion 31. The at least one flank 35 is extended outward and then is bent upward from an outer end of the at least one extension arm 34. The two flanks 35 are fastened in the two positioning notches 15 of the insulating body 1 for fastening the elastic element 3 to the insulating body 1. Each flank 35 has a perforation 36. The two buckling blocks 16 of the insulating body 1 are buckled in the two perforations 36 of the two flanks 35, so that the elastic element 3 is located to the insulating body 1, and the elastic element 3 is fastened to the insulating body 1.

In the preferred embodiment, the elastic element 3 has two elastic arms 32, two extension arms 34 and two flanks 35. Two front ends of two sides of the body portion 31 slantwise extend outward and rearward to form the two extension arms 34. The two extension arms 34 are slantwise extended outward and rearward from the two front ends of the two sides of the body portion 31. The two elastic arms 32 are slantwise extended frontward and outward, and then are extended frontward from two sides of the one end of the body portion 31. The two elastic arms 32 are slantwise extended frontward and outward, and then are extended frontward from two sides of the front end of the body portion 31. The two elastic arms 32 are slightly inclined upward. The front end of each elastic arm 32 is bent downward to form the snap hook 320. Two outer ends of the two extension arms 34 extend outward and then are bent upward to form the two flanks 35. The body portion 31, the at least one elastic arm 32 and the two extension arms 34 of the elastic element 3 are fastened in the fastening groove 18. The body portion 31, the two elastic arms 32 and the two extension arms 34 of the elastic element 3 are all accommodated in the fastening groove 18 of the insulating body 1. The tail portion 33 of the elastic element 3 projects out of the fastening groove 18, and then the tail portion 33 of the elastic element 3 projects upward into the interval 101 between the two extension portions 13 of the insulating body 1. The tail portion 33 projects beyond the two extension portions 13 of the insulating body 1 along an up-down direction. The tail portion 33 is located between two adjacent middle positioning portions 14. A distance between the two middle positioning portions 14 is larger than a distance between another two adjacent positioning portions 14. The soldering portion 23 of each terminal 2 is located in front of the tail portion 33. The soldering portion 23 of each terminal 2 is soldered with a corresponding wire of a cable (not shown).

The camshaft 4 has a rotating shaft 41, a cam portion 42 and an operating portion 43. The cam portion 42 is mounted around a middle of the rotating shaft 41. A front of the cam portion 42 is outwardly arched along a radial direction of the rotating shaft 41 to form a cam surface 420. The cam portion 42 is arranged corresponding to the tail portion 33 of the elastic element 3. When the cam surface 420 is located at a primal position, the cam surface 420 is located behind a rear surface of the tail portion 33 of the elastic element 3, and the cam surface 420 faces downward. When the rotating shaft 41 rotates, the cam surface 420 abuts against the rear surface of the tail portion 33 of the elastic element 3, the cam surface 420 of the cam portion 42 gradually slides frontward and upward to a tip of the tail portion 33 along the rear surface of the tail portion 33. The rotating shaft 41 rotates clockwise to make the cam surface 420 slide frontward and upward along the rear surface of the tail portion 33. When the cam surface 420 pushes the tail portion 33 to tilt frontward, the two extension arms 34 are twisted, and then the two elastic arms 32 move downward and abuts against an inner surface of a bottom of the shell 5, the two snap hooks 320 pass through the bottom of the shell 5 to be exposed below the shell 5. When the electrical connector 100 is connected with the docking connector 200, the two snap hooks 320 pass through the two openings 203 of the bottom wall of the outer shell 201 via an inside of the outer shell 201 of the docking connector 200, and then the two snap hooks 320 project out of the outer shell 201 via the two openings 203 of the bottom wall of the outer shell 201. Therefore, the electrical connector 100 is able to be locked with the docking connector 200.

A bottom of the shell 5 has a through hole 53 vertically penetrating through the bottom of the shell 5. The through hole 53 is corresponding to the snap hook 320. When the rotating shaft 41 rotates, the cam portion 42 pushes the tail portion 33 to twist the at least one extension arm 34, so the at least one elastic arm 32 moves outward, the at least one extension arm 34 drives the at least one elastic arm 32 to twist downward, and the snap hook 320 passes through the through hole 53. The bottom of the shell 5 has two through holes 53 vertically penetrating through the bottom of the shell 5. The two through holes 53 are corresponding to the two snap hooks 320. The shell 5 includes an upper shell 51 and a lower shell 52. The upper shell 51 and the lower shell 52 are assembled with each other to form the shell 5. Front ends of a top plate 523 and a bottom plate 522 of the lower shell 52 define a plurality of the through holes 53 vertically penetrating through the top plate 523 and the bottom plate 522 of the lower shell 52. The two lower lateral plates 521 are connected between two sides of the top plate 523 and two sides of the bottom plate 522. The plurality of the spring arms 202 of the plurality of the openings 203 of the docking connector 200 are arranged corresponding to the plurality of the through holes 53 of the shell 5. Rear ends of the spring arms 202 of the top wall and the bottom wall of the outer shell 201 are buckled in the plurality of the through holes 53. Two outer surfaces of the two lower lateral plates 521 are clamped between front ends of the spring arms 202 of the two side walls of the outer shell 201. The front ends of the spring arms 202 of the two side walls of the outer shell 201 abut against the two outer surfaces of the two lower lateral plates 521. The two snap hooks 320 of the elastic element 3 are arranged corresponding to the two through holes 53 of the lower wall of the front end of the lower shell 52. The two snap hooks 320 of the elastic element 3 project out of the two through holes 53 of the lower wall of the front end of the lower shell 52.

Two tops of two rear ends of two lower lateral plates 521 of the lower shell 52 are recessed downward to form two first assembling grooves 54, respectively. Two bottoms of two middles of two upper lateral plates 513 of the upper shell 51 are recessed inward to form two second assembling grooves 56, respectively. The two first assembling grooves 54 are arranged corresponding to the two second assembling grooves 56. After the upper shell 51 is assembled to the lower shell 52, the two lower lateral plates 521 of the lower shell 52 are attached to outer surfaces of the two upper lateral plates 513 of the upper shell 51, each first assembling groove 54 is cooperated with one second assembling groove 56 to form an assembling space 540. The rotating shaft 41 of the camshaft 4 passes through the two assembling spaces 540 of the shell 5, so that the camshaft 4 is located to the shell 5, and the camshaft 4 is fastened to the shell 5. The plurality of the clamping grooves 143 of the plurality of the positioning portions 14 of the insulating body 1 are in alignment with the two first assembling grooves 54 and the two second assembling grooves 56 of the electrical connector 100 along a transverse direction.

The rotating shaft 41 is accommodated in the clamping groove 143 of the at least one positioning portion 14. The rotating shaft 41 of the camshaft 4 is accommodated in the clamping grooves 143 of the plurality of the positioning portions 14, and the rotating shaft 41 of the camshaft 4 is located in the clamping grooves 143 of the plurality of the positioning portions 14. The rotating shaft 41 of the camshaft 4 passes through the two assembling spaces 540 of two sides of the shell 5. Two ends of the rotating shaft 41 project out of the two assembling spaces 540. The operating portion 43 is disposed at one end of the camshaft 4. The operating portion 43 is connected with one end of the rotating shaft 41. The operating portion 43 is a cylinder shape. The operating portion 43 is a circular shape seen from a side view. The operating portion 43 is positioned outside of one side of the shell 5 from the assembling space 540 of the one side of the shell 5. The cam portion 42 is located between the two middle positioning portions 14 which are adjacent to each other. Two opposite side surfaces of the cam portion 42 face towards two inner surfaces of the two middle positioning portions 14. The cam surface 420 of the cam portion 42 is arranged corresponding to an outer surface of the tail portion 33 of the elastic element 3. The cam surface 420 of the cam portion 42 abuts against the rear surface of the tail portion 33 of the elastic element 3.

Two rear ends of the two lower lateral plates 521 of the lower shell 52 define two first assembling holes 55 penetrating through the two lower lateral plates 521 of the lower shell 52 along the transverse direction. Two rear ends of the two upper lateral plates 513 of the upper shell 51 are punched outward to form two fixing pieces 57. The two fixing pieces 57 are fixed in the two first assembling holes 55, so that the upper shell 51 is located to the lower shell 52, and the upper shell 51 is fixed to the lower shell 52. Two sides of the bottom plate 522 of the lower shell 52 define two second assembling holes 58 vertically penetrating through the bottom plate 522 of the lower shell 52. The two second assembling holes 58 extend to two bottoms of the two lower lateral plates 521 of the lower shell 52. The two second assembling holes 58 are located in front of the two first assembling grooves 54. The two first assembling grooves 54 are located between the two first assembling holes 55 and the two second assembling holes 58.

Two bottoms of two front ends of the two upper lateral plates 513 of the upper shell 51 protrude downward to form two extension feet 59. The two extension feet 59 are in front of the two second assembling grooves 56. The two second assembling grooves 56 are located between the two fixing pieces 57 and the two extension feet 59. The two extension feet 59 are inserted into the two second assembling holes 58, and the two extension feet 59 are buckled to the two second assembling holes 58, so that the upper shell 51 is located to the lower shell 52, and the upper shell 51 is fixed to the lower shell 52. Two fronts of the two upper lateral plates 513 of the upper shell 51 protrude frontward to form two positioning feet 512.

The two positioning feet 512 clamp two sides of the base portion 11 of the insulating body 1. A middle of a main plate 514 of the upper shell 51 is punched downward to form a stopping portion 511. Two sides of the main plate 514 extend downward to form the two upper lateral plates 513. The stopping portion 511 is arranged corresponding to the cam portion 42. The stopping portion 511 is used for blocking the cam portion 42 and limiting a rotating angle of the cam portion 42, after the cam surface 420 of the cam portion 42 pushes the tail portion 33 of the elastic element 3, the cam surface 420 of the cam portion 42 is prevented from keeping rotating, and the cam surface 420 of the cam portion 42 is further prevented from breaking away from the tail portion 33, so that the two snap hooks 320 of the elastic element 3 are unaffected to be withdrawn from the outer shell 201 of the docking connector 200 and slide out of the two through holes 53 of the shell 5.

Referring to FIG. 1 to FIG. 7, when the electrical connector 100 is docked with the docking connector 200, the rotating shaft 41 rotates in a forward direction, the rotating shaft 41 rotates by rotating the operating portion 43 in the forward direction, the rotating shaft 41 rotates clockwise, and the rotating shaft 41 further drives the cam portion 42 to rotate. The cam surface 420 of the cam portion 42 slides frontward and upward to the tip of the tail portion 33 along the outer surface of the tail portion 33, and the cam surface 420 of the cam portion 42 pushes the tail portion 33 to twist the two extension arms 34. The two extension arms 34 drive the two elastic arms 32 to twist downward to abut against an inner surface of the shell 5. The two extension arms 34 drive the two elastic arms 32 to twist downward to abut against an inner surface of the bottom plate 522 of the shell 5. Simultaneously, the two snap hooks 320 of the two elastic arms 32 move downward, the two snap hooks 320 pass through the two through holes 53, and the two snap hooks 320 of the two elastic arms 32 are buckled to the two through holes 53 of the shell 5. The two snap hooks 320 of the two elastic arms 32 project out of the shell 5 through the two through holes 53 of the shell 5, and the two snap hooks 320 are buckled to the two openings 203 of the bottom wall of the outer shell 201 of the docking connector 200. The two snap hooks 320 are located behind the two spring arms 202 of the two openings 203 of the bottom wall of the outer shell 201. The two snap hooks 320 are exposed out of the outer shell 201 from the two openings 203. In this way, the electrical connector 100 is locked to the docking connector 200, so a connecting reliability of the electrical connector 100 is greatly improved.

Referring to FIG. 1 to FIG. 6, when the electrical connector 100 is disconnected from the docking connector 200, the rotating shaft 41 rotates in a reverse direction to a start position by rotating the operating portion 43 in the reverse direction, the rotating shaft 41 rotates anticlockwise, the rotating shaft 41 drives the cam surface 420 of the cam portion 42 to rotate anticlockwise to slide downward from the tip of the tail portion 33, and the cam portion 42 gradually breaks away from the tail portion 33 to make the at least one extension arm 34 elastically return to an original position, the at least one extension arm 34 drives the at least one elastic arm 32 to move to an initial position, the snap hook 320 is receded from the through hole 53, specifically, the cam surface 420 of the cam portion 42 gradually breaks away from the tip of the tail portion 33 to make the two extension arms 34 elastically return to two original positions. The two extension arms 34 drive the two elastic arms 32 to move to two initial positions, and simultaneously, the two snap hooks 320 of the two elastic arms 32 are receded from the two openings 203 of the outer shell 201 of the docking connector 200 and the two through holes 53 of the shell 5 to return into the shell 5, so the electrical connector 100 is unlocked with the docking connector 200.

As described above, the electrical connector 100 includes the plurality of the positioning portions 14, the elastic element 3, the camshaft 4 and the stopping portion 511, and the electrical connector 100 is able to be locked with the docking connector 200 by rotating the rotating shaft 41, the rotating shaft 41 drives the cam portion 42 to rotate, the cam surface 420 of the cam portion 42 gradually moves towards the tip of the tail portion 33 of the elastic element 3 along the outer surface of the tail portion 33, the two extension arms 34 twist by pushing the tail portion 33, the two extension arms 34 drive the two elastic arms 32 to move downward, the two elastic arms 32 abut against the inner surface the bottom plate 522 of the shell 5, the two snap hooks 320 are buckled to the two through holes 53 of the shell 5 and the outer shell 201 of the docking connector 200, so the electrical connector 100 is docked with the docking connector 200. Therefore, the electrical connector 100 is with a bolt-lock function, and the connecting reliability of the electrical connector 100 is greatly improved.

What is claimed is:

1. An electrical connector, comprising:

an insulating body;

a plurality of terminals fastened in the insulating body;

an elastic element mounted to a surface of the insulating body, the elastic element having a body portion, at least one elastic arm slantwise extended frontward and outward, and then extended frontward from one end of the body portion, at least one extension arm slantwise extended outward and rearward from at least one side of the body portion, and a tail portion slantwise extended upward and rearward from the other end of the body portion, a free end of the at least one elastic arm being bent downward to form a snap hook;

a camshaft arranged at a rear end of the insulating body, the camshaft having a rotating shaft and a cam portion, the cam portion being arranged corresponding to the tail portion of the elastic element; and a shell surrounding the insulating body, the plurality of the terminals, the elastic element and the camshaft, the shell having a through hole vertically penetrating through the shell, the through hole being corresponding to the snap hook;

wherein when the rotating shaft rotates, the cam portion pushes the tail portion to twist the at least one extension arm, so the at least one elastic arm moves outward, and the snap hook passes through the through hole.

2. The electrical connector as claimed in claim 1, wherein a convex surface of the snap hook faces frontward and upward, the snap hook is an arc shape, a front end of the at least one elastic arm is bent downward to form the snap hook.

3. The electrical connector as claimed in claim 1, wherein two front ends of two sides of the body portion slantwise extend outward and rearward to form two extension arms, two outer ends of the two extension arms extend outward and then are bent upward to form two flanks, the insulating body has a base portion, two sides of a rear end of the base portion are recessed inward to form two positioning notches, the two flanks are fastened in the two positioning notches.

4. The electrical connector as claimed in claim 3, wherein each flank has a perforation, two inner side walls of the two positioning notches oppositely protrude outward to form two buckling blocks, the two buckling blocks are buckled in the two perforations.

5. The electrical connector as claimed in claim 3, wherein a front end of the base portion extends frontward to form a tongue portion, a bottom surface of the base portion and a rear end of a bottom surface of the tongue portion are recessed inward to together form a fastening groove, the body portion, the at least one elastic arm and the two extension arms of the elastic element are fastened in the fastening groove.

6. The electrical connector as claimed in claim 5, wherein two sides of a lower portion of a rear end of the base portion extend rearward to form two extension portions, tops of rear ends of the two extension portions extend upward to form a plurality of positioning portions, each positioning portion is positioned between two adjacent terminals, each positioning portion has a front clamping section and a rear clamping section, the front clamping section and the rear clamping section are longitudinally separated from each other to form a clamping groove between the front clamping section and the rear clamping section, the rotating shaft of the camshaft is accommodated in the clamping grooves of the plurality of the positioning portions, the cam portion is located between the two middle positioning portions which are adjacent to each other, two opposite side surfaces of the cam portion face towards two inner surfaces of the two middle positioning portions.

7. The electrical connector as claimed in claim 6, wherein two sides of the top of the rear end of each extension portion protrude upward to form two positioning portions, each positioning portion is a U shape, a mouth of each U-shaped positioning portion faces upward, two free ends of each U-shaped positioning portion slightly protrude towards each other, so a top end of the mouth of each U-shaped positioning portion is narrower than a bottom end of the mouth of each U-shaped positioning portion.

8. The electrical connector as claimed in claim 6, wherein the shell includes an upper shell and a lower shell, two tops of two rear ends of two lower lateral plates of the lower shell are recessed downward to form two first assembling grooves, respectively, two bottoms of two middles of two upper lateral plates of the upper shell are recessed inward to form two second assembling grooves, respectively, the upper shell is matched with the lower shell, the two first assembling grooves are arranged corresponding to the two second assembling grooves, the two lower lateral plates are attached to outer surfaces of the two upper lateral plates, each first assembling groove is cooperated with one second assembling groove to form an assembling space, the rotating shaft of the camshaft passes through the two assembling spaces of the shell, the camshaft has an operating portion, the operating portion is disposed at one end of the camshaft, the operating portion is positioned outside of one side of the shell from the assembling space of the one side of the shell, a middle of a main plate of the upper shell is punched downward to form a stopping portion, the stopping portion is arranged corresponding to the cam portion, the stopping portion is used for blocking the cam portion and limiting a rotating angle of the cam portion.

9. The electrical connector as claimed in claim 8, wherein two rear ends of the two lower lateral plates of the lower shell define two first assembling holes penetrating through the two lower lateral plates of the lower shell along a transverse direction, two rear ends of the two upper lateral plates of the upper shell are punched outward to form two fixing pieces, the two fixing pieces are fixed in the two first assembling holes, so that the upper shell is located to the lower shell, two sides of a bottom plate of the lower shell define two second assembling holes vertically penetrating through the bottom plate of the lower shell, two bottoms of two front ends of the two upper lateral plates of the upper shell protrude downward to form two extension feet, the two extension feet are inserted into the two second assembling holes.

10. The electrical connector as claimed in claim 9, wherein the two first assembling grooves are located between the two first assembling holes and the two second assembling holes, the two second assembling grooves are located between the two fixing pieces and the two extension feet.

11. The electrical connector as claimed in claim 6, wherein the tail portion of the elastic element projects out of the fastening groove, and then the tail portion projects upward into an interval between the two extension portions of the insulating body, the tail portion projects beyond the two extension portions of the insulating body along an up-down direction, the tail portion is located between two adjacent middle positioning portions, a distance between the two middle positioning portions is larger than a distance between another two adjacent positioning portions.

12. The electrical connector as claimed in claim 6, wherein the insulating body has a plurality of terminal grooves, each terminal is disposed in one corresponding terminal groove, each terminal has a fixing portion, a contacting portion and a soldering portion, a front end of the fixing portion extends frontward to form the contacting portion, a rear end of the fixing portion extends rearward, then is bent upward, and further extends rearward to form the soldering portion, the fixing portion of each terminal is fastened in the base portion of the insulating body, the fixing portion of each terminal is surrounded by the base portion, the fixing portion of each terminal is fixed in one terminal groove, the contacting portion of each terminal is fixed in the tongue portion of the insulating body, and the contacting portion of each terminal is exposed to an upper surface of the tongue portion, a rear end of the fixing portion extends rearward, then is bent upward, and further extends rearward to form the soldering portion, the soldering portion of each terminal is exposed to an upper surface of a rear end of the base portion of the insulating body, the soldering portion of each terminal is located in front of the camshaft, the soldering portion of each terminal is located in front of the tail portion, a top surface of the fixing portion of each terminal protrudes upward to form a protruding portion, the protruding portion of the fixing portion of each terminal abuts against an inner surface of a wall of the one terminal groove of the insulating body.

13. An electrical connector, comprising:

an insulating body having a base portion, and an extension portion extended rearward from a rear end of the base portion, the extension portion extending upward or downward to form at least one positioning portion, the at least one positioning portion having a front clamping section and a rear clamping section, the front clamping section and the rear clamping section being longitudinally separated from each other to form a clamping groove between the front clamping section and the rear clamping section;

a plurality of terminals fastened in the base portion of the insulating body;

an elastic element mounted to a bottom surface of the insulating body, the elastic element having a body portion, at least one elastic arm slantwise extended frontward from one end of the body portion, at least one extension arm extended laterally from at least one side of the body portion, and a tail portion slantwise extended upward and rearward from the other end of the body portion, the at least one elastic arm being slightly inclined upward, a front end of the at least one elastic arm being bent downward to form a snap hook;

a camshaft having a rotating shaft and a cam portion, the cam portion being arranged corresponding to the tail portion of the elastic element, the rotating shaft being accommodated in the clamping groove of the at least one positioning portion; and a shell surrounding the insulating body, the plurality of the terminals and the elastic element, a bottom of the shell having a through hole vertically penetrating through the bottom of the shell, the through hole being corresponding to the snap hook;

wherein when the rotating shaft rotates in a forward direction, the rotating shaft drives the cam portion to rotate, the cam portion pushes the tail portion to twist the at least one extension arm, the at least one extension arm drives the at least one elastic arm to twist downward, the snap hook passes through the through hole; and wherein when the rotating shaft rotates in a reverse direction, the cam portion gradually breaks away from the tail portion to make the at least one extension arm elastically return to an original position, the at least one extension arm drives the at least one elastic arm to move to an initial position, the snap hook is receded from the through hole.

14. An electrical connector cooperated with a docking connector, the docking connector including an outer shell, two sides of a bottom wall of the outer shell defining two openings, the electrical connector comprising:

an insulating body;

a plurality of terminals fastened in the insulating body;

an elastic element mounted to a surface of the insulating body, the elastic element having a body portion, two elastic arms slantwise extended frontward and outward, and then extended frontward from two sides of one end of the body portion, two extension arms slantwise extended outward and rearward from two front ends of two sides of the body portion, and a tail portion slantwise extended upward and rearward from the other end of the body portion, the two elastic arms being slightly inclined upward, a front end of each elastic arm being bent downward to form a snap hook;

a camshaft arranged at a rear end of the insulating body, the camshaft having a rotating shaft and a cam portion, a front of the cam portion being outwardly arched along a radial direction of the rotating shaft to form a cam surface, the cam portion being arranged corresponding to the tail portion of the elastic element; and a shell surrounding the insulating body, the plurality of the terminals, the elastic element and the camshaft, a bottom of the shell having two through holes vertically penetrating through the bottom of the shell, the two through holes being corresponding to the two snap hooks;

wherein when the rotating shaft rotates in a forward direction, the rotating shaft drives the cam portion to rotate, the cam surface of the cam portion slides frontward and upward to a tip of the tail portion along a rear surface of the tail portion, the cam surface of the cam portion pushes the tail portion to twist the two extension arms, the two extension arms drive the two elastic arms to twist downward to abut against an inner surface of the shell, the two snap hooks are buckled to the two through holes, the two snap hooks project out of the shell through the two through holes, and the two snap hooks are buckled to the two openings of the docking connector, the electrical connector is locked to the docking connector; and wherein when the rotating shaft rotates in a reverse direction, the rotating shaft drives the cam surface of the cam portion to rotate to slide downward from the tip of the tail portion, the cam surface of the cam portion gradually breaks away from the tip of the tail portion to make the two extension arms elastically return to two original positions, the two extension arms drive the two elastic arms to move to two initial positions, the two snap hooks are receded from the two openings and the two through holes, so the electrical connector is unlocked with the docking connector.

15. The electrical connector as claimed in claim 14, wherein the shell includes an upper shell and a lower shell, the upper shell and the lower shell are assembled with each other to form the shell, two lower lateral plates of the lower shell are attached to outer surfaces of two upper lateral plates of the upper shell, front ends of a top plate and a bottom plate of the lower shell define a plurality of the through holes vertically penetrating through the lower shell, the two lower lateral plates are connected between two sides of the top plate and two sides of the bottom plate, a top wall, a bottom wall and two side walls of the outer shell define a plurality of openings, a front inner wall of each opening of the top wall and the bottom wall of the outer shell extends rearward and towards a front end of the electrical connector, and then is arched inward to form a spring arm, rear ends of the spring arms of the top wall and the bottom wall of the outer shell are buckled in the plurality of the through holes.

* * * * *